Figure 1:
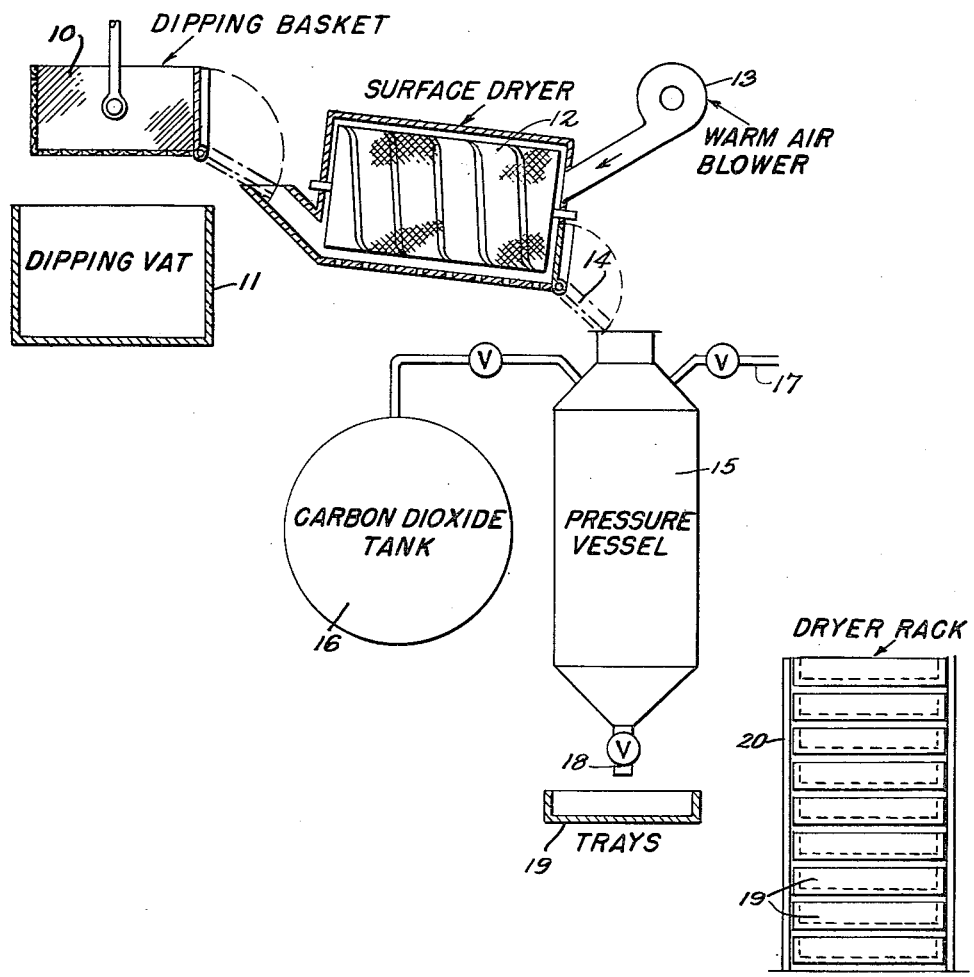

Sept. 4, 1956   D. R. BAILEY   2,761,781
METHOD FOR MAKING NUT KERNELS FRIABLE
Filed June 14, 1954

INVENTOR.
DAVID R. BAILEY
BY
ATTORNEY

United States Patent Office 2,761,781
Patented Sept. 4, 1956

2,761,781
METHOD FOR MAKING NUT KERNELS FRIABLE

David R. Bailey, Sacramento, Calif.

Application June 14, 1954, Serial No. 436,511

10 Claims. (Cl. 99—126)

This invention relates to a method for making nut meats or kernels friable and more particularly relates to such a method in which nut meats are rendered more easily crumbled by steps which induce internal fracture of the body structure of such nut kernels.

The method may be equally applicable to other products having high protein content, such as dried lima beans, soy beans, peas, and the like, but is disclosed herein in its relation to nut kernels.

The invention is predicated on the discovery that the scissibility and masticatory quality of nut kernels may be enhanced by artificially increasing their internal friability by subjecting them to pressure of a gaseous fluid in a closed reactor chamber at sufficient pressure to internally fracture the body of the kernel and that such internal fracture is facilitated in certain kernels, such as nonpareil almonds by maintaining the outer layer of the kernel sufficiently tenaceous and stretchable to serve as an enclosing shell for the internally fractured portion of the kernel. Included in the term friable quality is a tenderizing of the kernels which increases facility for masticating the kernel by chewing and adds to its edibility and digestability as food, facilitating its cutting with a knife when the kernels are used in pastry such as cakes and bread, and increasing crunchiness when the kernels are employed in ice cream, candy and the like.

While the internal fracture of the kernels may to a great extent be physical phenomena which may be accomplished by pressure of any gaseous fluid, including air, it has been demonstrated that carbon dioxide gas is not only efficient for the purpose, but is preferred because it is extremely soluble in the nut kernels, it is relatively inert, it leaves no foreign aftertaste in the kernels treated, it is inexpensive, and may, if desired, be recovered for reuse at an expense reasonably commensurate with its economic value. Other gases, by comparison with carbon dioxide, have one or more of the following objections: insufficient solubility to produce the tenderizing effect, excessive cost for practical commercial operations, condense to liquid when under high pressure, react destructively when under pressure with the kernels, react with the oil of the kernels to accelerate rancidity, leave objectionable tasting residues, or react to alter chemical properties or denaturize the kernels. Some or all of these objectionable factors may be overcome so that other gaseous fluids may be successfully and economically employed, but carbon dioxide has advantages in the process other than its mere fluidity as a gas, and is, therefore, the preferred form.

While the invention is practical for treatment of various kinds of nut kernels, such as almonds, filberts, pecans, English walnuts, cashews and peanuts, the almond is used herein in decribing one exemplification of the use of the invention, it being here noted that in practicing the process the physical characteristics of the particular kernels treated must be taken into consideration, and those kernels which are normally and naturally relatively resistant to breakage or dismemberment, such as almonds and filberts, require a higher pressure of gas than nut meats having relatively softer bodies such as English walnuts and pecans, or even certain varieties of almonds which are relatively soft. However, the Nonpareil variety of almonds is the most prolifically grown and marketed and the description of the invention is therefore primarily related to that variety.

In describing the invention it is to be assumed that the use of the nut name, such as walnuts or almonds, means the kernel of the nut after the outer shell has been removed and regardless of whether or not the pellicle has been removed from the kernel.

Briefly described in a broad sense, the invention comprises subjecting nut meats to pressure of a gaseous fluid in a closed pressure reactor chamber to internally fracture the internal body tissue of the kernels. More specifically such internal fracture is facilitated by presoaking of the nut kernels in water for a short time for aqueous penetration of a relatively thin outer layer to provide a subcoriaceous stretchability thereof, and optionally surface drying the kernels, and while the outer layer is still moist and stretchable, subjecting them to alternated pressurization and expansion of a substantially inert gas such as carbon dioxide for selective periods of time, followed by a drying operation. The apparatus employed may be entirely conventional and having no novelty per se separate and apart from the process herein.

While it is to be understood that the broad scope of the invention contemplates the discovery that friability may be imparted to nut kernels by internal fracture of the body tissue thereof responsive to subjecting them to pressure of a gaseous fluid, a more particularized description of a preferred series of steps by which the invention may be practiced is herein set forth, in connection with the accompanying schematic drawing of a suitable apparatus by which the steps of the method may be illustrated and accomplished. In the drawing:

Fig. 1 is a side elevational view of a schematic form of suitable apparatus for employing the steps of the method.

In the exemplification herein a preferred form of the invention is described in the application of the invention to Nonpareil almonds.

Referring to the accompanying drawing 10 indicates any suitable mesh dipping basket for receiving a supply of kernels to be treated and 11 is a vessel or vat in which the almond kernels as the first step in the process are dipped and presoaked for a relatively short period of time in ordinary water at normal room temperatures, ranging from 32° to 120° F., the broad range of temperature being given to indicate that it is not desired to subject the almonds to a presoak in water at either freezing or cooking temperatures; any available temperature in between those ranges is satisfactory for the performance of the process.

The first step of presoaking is not a saturation of the kernels throughout their body, but is merely for thoroughly wetting the kernels superficially and is therefore preferably for a period of one-half minute to five minutes, depending on the dryness of the kernels and the temperature of the water, an average presoak of approximately one minute at a temperature of substantially 60° F. being efficient and preferred. It is not essential that the kernel shall actually be immersed in a body of water, since any form of thorough surface wetting is sufficient, such as spraying in a revolving tumbler drum.

The second step in the process is to drain off the surface water of the presoak which may be done by the mesh dipping basket or remove the kernels therefrom but leaving the surface of the kernels wet, and maintaining them wet for ten to twenty minutes or what may be termed a tempering time for the outer layer of the kernal to become penetrated by the moisture to a depth of substantially one thirty-second of an inch. This so-called wet tempering takes from 15 to 30 minutes at the aforesaid temperatures, likewise dependent on the character and dryness of the kernels. The purpose and result of such tempering is to make the outer layer of the kernel temporarily stretchable or subcoriaceous and provides a temporarily relatively tough outer coat as a shell within which the interior fiber of the kernel may be fractured and thus made more tender and crunchy.

An optional third step in the process is not absolutely essential in the treatment of all nut kernels. It consists of a surface or superficial drying of the kernels after the so-called wet tempering of the outer layer, sufficient only to remove excess moisture from the pellicle without removing the moisture from the stretchable outer layer. This step is more especially adapted to treating of almonds having the pellicle thereon for the purpose of preventing the loosening of the pellicle from the nut meat. It is not a necessary step with almonds which have had the pellicle removed and are generally referred to as blanched. This optional third step may be accomplished by any suitable dryer, such as a slowly revolving mesh drum 12, supplemented by a warm air blower 13.

Following the so-called tempering of the kernels, and the surface drying if that step is employed, and in either event while the outer layer retains moisture and is stretchable, they are transferred through a suitable chute 14 to a reactor pressure chamber 15 which is thereupon sealed and the nut kernels subjected to alternate pressures and expansions of carbon dioxide gas introduced under desired pressure from tank 16 and expanded and exhausted through outlet tube 17.

It is preferred that the pressurization and expansion treatment be repeated a plurality of times, though a single treatment has a substantial effect in internally fracturing the kernels and rendering them appreciably more friable. In application to the variety of almonds known as Nonpareils, and some other nuts, such as filberts, the pressure of carbon dioxide gas is of the order of 700 to 800 pounds per square inch, substantially 750 pounds pressure being preferred, for a period of 7 to 12 minutes and preferably 8 minutes, followed by a release or exhaust of the pressure to substantially atmospheric, which, in effect, is an expansion of the gas and release of pressure thereof on the nut kernels.

Preferably a second treatment of the almonds to pressurization of carbon dioxide gas follows the first such treatment, at substantially a similar pressure, for a similar time and followed by a similar exhaust of the pressure and expansion of the gas.

Also, preferably, a third carbon dioxide bath of the almonds follows the second such treatment at a substantially similar pressure, but for a period of time of 20 to 30 minutes, and is thereafter exhausted or expanded in the same way.

As a result of extensive experiments, it is believed that at least three treatments of the nuts to alternated pressure and expansion provide the optimum results. Experiments have also shown that if all of the gas pressure treatments are combined into one long treatment the kernels are badly ruptured; two treatments of short duration, as compared to one long treatment, appear to be insufficient to produce the desired increase in friability in almonds. Three treatments appear to be the optimum in result, consistent with relative cost and efficiency, though a fourth treatment similar in pressure and time to the third treatment is appreciably beneficial but not sufficiently so to justify the additional cost of the operation and a slight increase in breakage which is probably caused by the fact that after three gas treatments the frangibility of the kernels has been increased.

The exhaust or expansion time for the reducing and dissipating the pressure of the carbon dioxide gas is preferably substantially the same in each instance, and may be suitably described as a delayed exhaust and expansion extending over a period of 15 seconds to several minutes, since the pressure steps will have increased or swelled the physical size of the almonds by fracturing the internal tissue of the almond body and filling the interstices with gas and it takes some amount of time for the stretchable outer layer of the kernel to contract and thus exhaust to a practical working extent the occluded gas from the disperse system in the tiny fractures within the nut body though some small portion of the gas may, in varying amounts, remain entrapped in the fibers for several hours, during which time the kernels remain in the same expanded or swelled condition, as evidenced by the tested result that untreated kernels of Nonpareil almonds have an average specific gravity of 1.07 to 1.04 whereas the average specific gravity of such kernels after treatment by this process is in the range of .92 to .90. Experience has also demonstrated that a gas pressure substantially in excess of 800 pounds per square inch followed by an instantaneous or too rapid an exhaust of the gas following the pressure steps causes excessive fracture, splits the nuts both on their natural seam, and sometimes into multiple pieces throughout the body of the nut and causes portions of the nuts to become coarse powder or meal.

After subjecting the nut kernels to the several applications of the pressured gas and the related exhaust expansions, the kernels are removed from the pressure reactor, as by an outlet opening 18, and then dried, since they are apparently substantially as moist in the outer coating after the pressure steps as when they were placed in the reactor. The drying operation may be by spreading the almonds on shelves 19, sun dried, or infrared lamps may be employed, or any suitable dryer such as an oven 20 conventionally illustrated in the drawing. This drying removes the moisture and stretchability of the outer layer, the entire body of the kernel being thus rendered crunchy and friable due to the relative thinness of the outer layer which, by the drying, has become a thin readily frangible enveloping sheet internally supported only by the fractured, blown-up interior body of the kernel, and thereby has its masticability and frangibility greatly enhanced.

The steps of the process have been defined with more particularity in respect of Nonpareil almonds because that is the variety of nut kernel which it is believed is most widely commercialized and is adapted most generally to the process. However, the process is applicable to other varieties of almonds such as the Mission variety of almonds, and to other nut meats such as English walnuts, pecans, cashews and peanuts, and the process is substantially the same except that the pressure of the carbon dioxide gas in the three applications thereof in the reactor is maintained at a lower pressure of substantially 600 pounds per square inch.

The method of testing the friability or the hardness of the almonds was by a hardness testing device (known in the trade as the Strong-Cobb hardness tester), according to which it is demonstrated that satisfactory friability should register an index hardness range of 12 to 14 on such tester since kernels having an index substantially in excess of the index range 14 possess undesirable characteristics of masticability. In demonstrating the process the following significant index figures are informative:

Variety of almonds:   Friability index range
   Untreated Nonpareils, with pellicle____ 17.2 to 20
   Treated Nonpareils, with pellicle_____ 12.4 to 15
   Untreated blanched Nonpareils_____ 20.4
   Treated blanched Nonpareils_____ 14.2 to 16.6

All steps of the process may be carried out at any normal room temperatures, and the temperatures stated herein for certain steps are not by way of limitation, but merely to indicate that neither freezing nor cooking temperatures are a part of the process and are not requisite, and may even be detrimental.

Having thus described the invention what is claimed as new and patentable is:

1. A method of increasing the friability of nut kernels comprising fracturing the substance of the body of the kernels by confining the kernels and subjecting them while confined to pressurization and expansion of a gaseous fluid, the expansion of the gaseous fluid being over a substantial period of time as compared to an uncontrolled expansion thereof.

2. A method of increasing the friability of nut kernels as defined in claim 1, and in which the kernels are subjected to a plurality of successively alternated pressurizations and delayed expansions of the gaseous fluid.

3. A method of the character described having the steps of claim 1, and in which stretchability is induced in a relatively thin outer layer of the kernels prior to said pressurization and expansion by subjecting the kernels to moisture and limiting such permeation by moisture to the outer layer thereof.

4. In a method of increasing the friability of nut kernels, the steps defined in claim 1 and in which the gaseous fluid is a carbon dioxide gas.

5. A method of increasing the friability of nut kernels, comprising the steps of subjecting the nut kernels to moisture and limiting permeation of the kernels by moisture to the outer layer thereof, confining the kernels and subjecting them to a plurality of successively alternated pressurizations and expansions of carbon dioxide gas, releasing the kernels from such pressures by controlling the expansions of the gas over a substantial period of time, removing the kernels from such confinement and drying the moisture from the outer layer.

6. A method of increasing the friability of nut kernels comprising the steps defined in claim 5, and in which the outer layer of the kernels is moistened to a depth of substantially one-thirty-second of an inch.

7. In a method of increasing the friability of nut kernels, the steps defined in claim 5, and in which the alternated steps of pressure and expansion are repeated until the internal body of the nut within the moistened outer layer is fractured.

8. A method of the character described having the steps of claim 5, and in which the pressure of the carbon dioxide gas is of the order of 750 pounds per square inch.

9. A method of the character described having the steps defined in claim 5, and in which the free water on the surface of the kernels is removed after the outer layer has been moistened and before the kernels are subjected to pressure of carbon dioxide gas.

10. In a method of increasing the friability of nut kernels, the steps defined in claim 5, and in which there are at least three successively alternated pressurizations and expansions of the carbon dioxide gas in which the pressure of the gas is of the order of 750 pounds per square inch, the third application of the gas pressure being of substantially longer duration of time than the time of the initial two applications of such gas pressure.

References Cited in the file of this patent

UNITED STATES PATENTS

| | | |
|---|---|---|
| 1,789,946 | Rector | Jan. 20, 1931 |
| 2,147,097 | Horvath | Feb. 14, 1939 |
| 2,278,467 | Musher | Apr. 7, 1942 |
| 2,375,833 | Urquhart | May 15, 1945 |